United States Patent [19]

Hillock et al.

[11] Patent Number: 4,981,061
[45] Date of Patent: Jan. 1, 1991

[54] STEEL RULE DIE AND METHOD OF MANUFACTURE

[76] Inventors: Ronald A. Hillock, 47611 Lexington, Utica, Mich. 48087; Steven B. Ross, 28459 Floral, Roseville, Mich. 48066

[21] Appl. No.: 347,572

[22] Filed: May 5, 1989

[51] Int. Cl.⁵ .............................................. B21K 5/20
[52] U.S. Cl. ...................................... 83/697; 83/701; 76/DIG. 6; 76/107.8
[58] Field of Search ................ 83/652, 698, 701, 697, 83/684, 686, 927, 694; 76/107 C, DIG. 6

[56] References Cited

U.S. PATENT DOCUMENTS

| 1,701,546 | 2/1929 | Shaw | 76/107 C |
| 3,170,358 | 2/1965 | Martin | 76/107 C |
| 3,322,004 | 5/1967 | Wolfe | 76/107 C |
| 3,395,598 | 8/1968 | Martin | 76/107 C |
| 3,941,039 | 3/1976 | Bishop | 76/107 C |
| 4,052,886 | 10/1977 | Buick | 76/107 C |
| 4,509,358 | 4/1985 | Krowl | 76/DIG. 6 |
| 4,531,289 | 7/1985 | Brick | 83/701 |

Primary Examiner—Frank T. Yost
Assistant Examiner—Scott A. Smith
Attorney, Agent, or Firm—John R. Benefiel

[57] ABSTRACT

A steel rule die is disclosed having strengthening layers bonded to the die board to stiffen the die board against flexing during handling, while alleviating the tendency to loosen the steel rule during handling and enhancing the durability of the die. KEVLAR graphite fiber fabric is impregnated and bonded to either face of the die board with epoxy resin.

9 Claims, 2 Drawing Sheets

STEEL RULE DIE AND METHOD OF MANUFACTURE

This invention concerns steel rule dies. Steel rule dies are in very widespread use for the die cutting of parts or blanks from sheet material. Such dies are constructed by cutting a slot in a die board (usually of plywood) in the pattern required, forming steel cutting rule into the same pattern, and fitting the rule into the slot in the die board. Such dies can be constructed at relatively low cost, and are used extensively in cutting out auto trim parts from textile, foam, paper, plastic, fiberboard, and similar soft materials.

Sheet metal blanks are usually cut by the use of very costly dies machined from steel because of the higher press tonnages required and the likelihood of early failure of steel rule dies when used for high volume production. The use of steel rule dies has therefore been limited to die cutting of steel blanks for prototypes and pilot production runs. With the increasing number of car models, the lowered production volumes has made the use of amortized cost of such dies much higher. It is also much more costly to make corrections or changes in the blank pattern after machined steel dies are constructed.

The present inventors have recognized that it would be very advantageous if low cost steel rule dies could reliably be used to die cut production runs of sheet steel blanks. These inventors have determined that the cause of early failure of steel rule dies has been in the loosening of the rule in the die board, and have further discovered that such loosening occurs in handling of the completed die incidental to installing, removing, storing, and other handling of the die in start up and completing of intermittent production runs. For the large die sizes often encountered for this application, flexing of the board inevitably occurs during handling, and this flexing loosens the rule in the board and leads to early failure.

SUMMARY OF THE INVENTION

The present invention comprises a lamination system applied to the opposite surfaces, of a die board to greatly increase its rigidity and correspondingly decrease the degree of flexing of the die board during handling. This in turn minimizes the extent of loosening of the rule and lengthens the life of the die.

This lamination system comprises layers of high tensile strength fabric material of woven graphite fibers bonded to either side of the die board with epoxy resin. The die board and fabric layers coated with epoxy are compressed in a press for an extended period to achieve complete impregnation of the fabric layers with epoxy resin. The reinforced die board is slotted in the die pattern, and the rule pressed fit in the conventional fashion, but a bead of epoxy resin is run along the sides of the steel rule after assembly to hold the rule rigidly upright in the die board slot. The advantageous effect of the substantially increased rigidity of the die board has been to markedly improve the service life of the die through repeated set up and removal cycles, to achieve the object of the invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
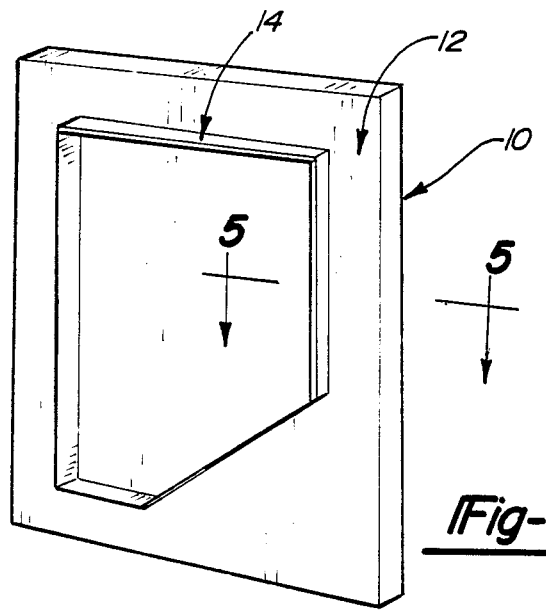
FIG. 1 is a perspective view of a steel rule die constructed according to the present invention.

Referring to the Drawings, FIG. 1 illustrates a steel rule die 10 constructed according to the present invention including a reinforced die board 12 having a slot receiving a pattern of rule 14 formed into the shape of the blank to be die cut.

Figure 2:
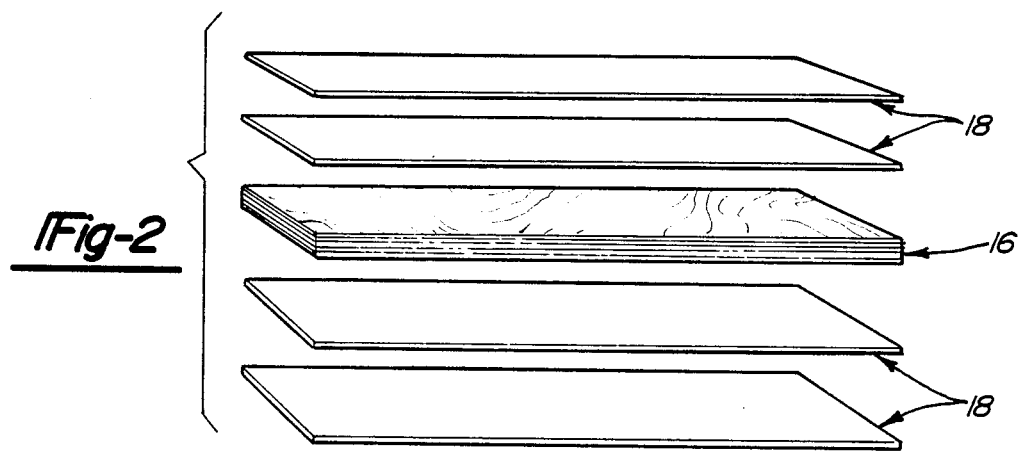
FIG. 2 is an exploded perspective view of a die board and the fabric stiffening layers laminated to either face in constructing the die board according to the present invention.

FIG. 2 illustrates the die board 12 comprised of a maple plywood core 16 having a stiffening lamination system, including a pair of graphite fiber fabric layers 18.

Such material is commercially available under the trademark "KEVLAR" and comprises extremely strong fibers of graphite material. Sheets of a thickness of approximately 1/32 of an inch has been found to perform satisfactorily.

The layers 18 are laminated to each other and the core 16 by applying 1/16 inch coats of epoxy resin material, also commercially available, on either side of the core 16, intermediate each layer 18 and over the outermost layer 18. The core 16 is prefereably comprised of ⅝ inch maple plywood so that a standard finished ¾ inch thickness of the board 12 is achieved.

Figure 3:
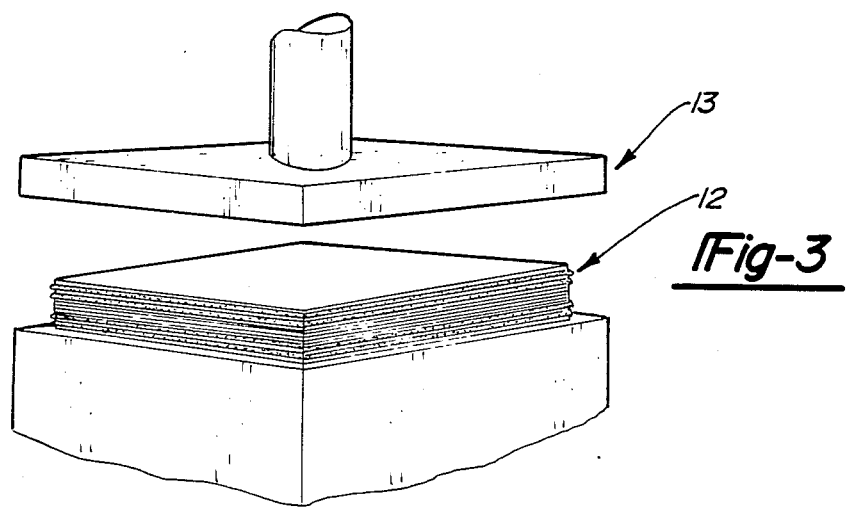
FIG. 3 is a perspective view of the die board and stiffening layers assembled thereto and placed in a press.

FIG. 3 illustrates that the resulting sandwich is placed in a press 13 where a pressure of 500 tons is applied to a 4'×8' die board for a period of 1-2 hours, insuring complete impregnation of the fibers of the layers 18 during curing of the epoxy.

The resulting die board 12 exhibits extremely rigid characteristics, resisting significant flexing during normal handling.

A slot 20 is cut into the board 12, as by sawing by conventional techniques, in the shape of the part, leaving bridging sections 22 in the board 12 according to such conventional practice. Drilled openings 23 are located at either side of the slots 20. The rule pattern 14 is formed with corresponding notches 24 to receive the bridging sections 22 in the die board 12.

Figure 5:
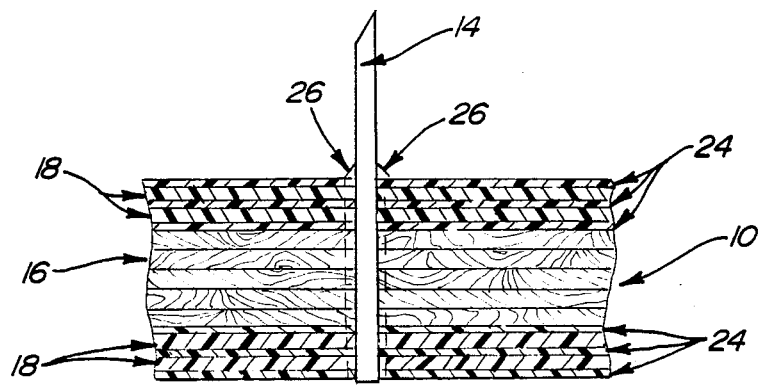
FIG. 5 is a fragmentary view of the section 5—5 taken in FIG. 1.
Figure 4:
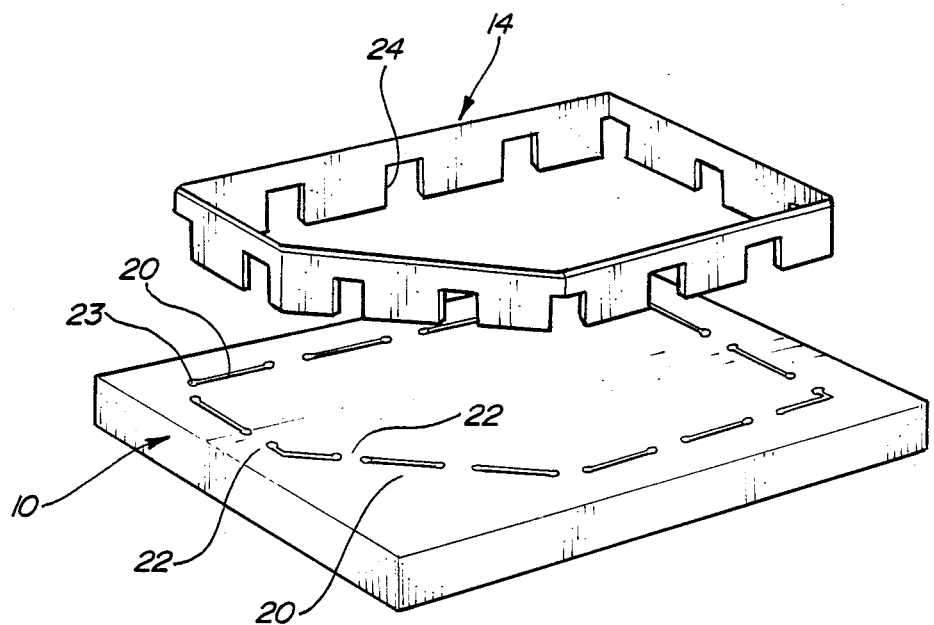
FIG. 4 is an exploded perspective view of a die board slotted to accept a shaped pattern of steel rule also shown.

FIG. 5 illustrates a section through the completed die 10 including the laminated KEVLAR (TM) layers 18 interspaced with epoxy resin, which is run along either side of the rule 14 to stiffen the rule 14 in the region of the bridging sections 22.

The resulting die 10 is greatly stiffened to avoid the tendency for loosening of the rule 14 as a result of flexing of the die board 12 during handling. Substantially improved durability is therefore enabled to render such dies suitable for production runs of sheet steel blanks. The coating of the die board 12 also protects against the absorption of grease and oil and presents a more permanent looking appearance.

We claim:

1. A flat bed steel rule die comprising a flat plywood sheet having opposite faces and formed with a slot pattern extending in a pattern corresponding to a part to be die cut, a steel rule piece extending in a shape corresponding to said pattern, said steel rule piece fit into said slot pattern, said die characterized by a stiffening lamination bonded to each opposite face of said plywood sheet composed of at least one layer of graphite fiber fabric bonded to each opposite face of said plywood sheet to form a stiffened die board.

2. The steel rule die according to claim 1 further including a series of said fabric layers bonded on each opposite face of said plywood sheet.

3. The steel rule die according to claim 2 further including coatings of epoxy resin bonding each series of said fabric layers to each other and a respective opposite face of said plywood sheet.

4. The steel rule die according to claim 3 wherein said epoxy coatings impregnate said fabric layers.

5. The steel rule die according to claim 4 wherein said graphite fiber fabric layers comprise KELVAR (TM) material.

6. The steel rule die according to claim 3 further including a bead of epoxy resin applied to the rule along either side of the slot in said die board.

7. A method of making a flat bed durable steel rule die including the steps of:

constructing a high stiffness die board by bonding high tensile strength fiber fabric layers to each face of a flat sheet of plywood;

cutting a slot pattern in said high stiffness die board in the form of the part to be cut by said die;

forming a rule piece in the shape of said slot pattern;

assembling said rule piece into said slot pattern.

8. The method according to claim 7 wherein said fabric layers are bonded by applying coats of epoxy resin to said fabric layers.

9. The method according to claim 7 wherein said coatings of epoxy resin, fabric layers and die board are compressed in a press during curing of said epoxy resins to impregnate said fabric layer with epoxy resin.

* * * * *